United States Patent
Yonehara et al.

(10) Patent No.: US 10,297,861 B2
(45) Date of Patent: May 21, 2019

(54) ANION CONDUCTING MATERIAL AND CELL

(71) Applicant: NIPPON SHOKUBAI CO., LTD., Osaka-shi, Osaka (JP)

(72) Inventors: Koji Yonehara, Osaka (JP); Hironobu Ono, Hyogo (JP); Satoshi Ogawa, Osaka (JP); Yasuyuki Takazawa, Osaka (JP); Hiroko Harada, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 339 days.

(21) Appl. No.: 14/764,386

(22) PCT Filed: Jan. 30, 2014

(86) PCT No.: PCT/JP2014/052116
§ 371 (c)(1),
(2) Date: Jul. 29, 2015

(87) PCT Pub. No.: WO2014/119665
PCT Pub. Date: Aug. 7, 2014

(65) Prior Publication Data
US 2015/0364790 A1    Dec. 17, 2015

(30) Foreign Application Priority Data

Feb. 1, 2013  (JP) .................................. 2013-018635
Jun. 7, 2013  (JP) .................................. 2013-120928

(51) Int. Cl.
*H01M 10/0565*    (2010.01)
*H01G 11/52*    (2013.01)
(Continued)

(52) U.S. Cl.
CPC ........ *H01M 10/0565* (2013.01); *H01B 1/122* (2013.01); *H01G 11/30* (2013.01);
(Continued)

(58) Field of Classification Search
None
See application file for complete search history.

(56) References Cited

U.S. PATENT DOCUMENTS 4,415,636 A    11/1983 Charkey
5,795,679 A     8/1998 Kawakami et al.
(Continued)

FOREIGN PATENT DOCUMENTS

EP    0 578 501    1/1994
JP    57-163963    10/1982
(Continued)

OTHER PUBLICATIONS

Liao et al. "Structure and conductive properties of poly(ethylene oxide)/layered double hydroxide nanocomposite polymer electrolytes." Electrochemica Acta 49 (2004) 4993-4998.*
(Continued)

*Primary Examiner* — Alix E Eggerding
(74) *Attorney, Agent, or Firm* — Hamre, Schumann, Mueller & Larson, P.C.

(57) ABSTRACT

The present invention aims to provide an anion conducting material having excellent anion conductivity and durability, which can be suitably used as a separator, an electrolyte, or an electrode protecting agent of an alkaline cell, for example. The present invention also aims to provide a cell including a cell component containing the anion conducting material. The present invention provides an anion conducting material containing a polymer and a compound containing at least one element selected from Groups 1 to 17 of the periodic table.

3 Claims, 4 Drawing Sheets

(51) Int. Cl.

| | |
|---|---|
| *H01M 2/16* | (2006.01) |
| *H01M 10/26* | (2006.01) |
| *H01M 4/62* | (2006.01) |
| *H01M 6/18* | (2006.01) |
| *H01B 1/12* | (2006.01) |
| *H01G 11/30* | (2013.01) |
| *H01G 11/62* | (2013.01) |
| *H01M 4/24* | (2006.01) |
| *H01M 4/48* | (2010.01) |
| *H01M 8/1039* | (2016.01) |
| *H01M 8/1048* | (2016.01) |
| *H01M 10/24* | (2006.01) |
| *H01M 4/92* | (2006.01) |
| *H01M 10/30* | (2006.01) |
| *H01M 12/08* | (2006.01) |
| *H01G 11/38* | (2013.01) |
| *H01G 11/48* | (2013.01) |
| *H01M 8/1018* | (2016.01) |

(52) U.S. Cl.
CPC ............ *H01G 11/52* (2013.01); *H01G 11/62* (2013.01); *H01M 2/16* (2013.01); *H01M 4/244* (2013.01); *H01M 4/48* (2013.01); *H01M 4/622* (2013.01); *H01M 4/623* (2013.01); *H01M 4/92* (2013.01); *H01M 4/925* (2013.01); *H01M 6/181* (2013.01); *H01M 8/1039* (2013.01); *H01M 8/1048* (2013.01); *H01M 10/24* (2013.01); *H01M 10/26* (2013.01); *H01M 10/30* (2013.01); *H01M 12/08* (2013.01); *H01G 11/38* (2013.01); *H01G 11/48* (2013.01); *H01M 2/166* (2013.01); *H01M 2008/1095* (2013.01); *H01M 2300/0082* (2013.01); *Y02E 60/128* (2013.01); *Y02E 60/13* (2013.01)

(56) References Cited

U.S. PATENT DOCUMENTS

| | | | |
|---|---|---|---|
| 6,372,837 B1* | 4/2002 | Fischer | C08K 7/00 524/445 |
| 2002/0148723 A1 | 10/2002 | Takata et al. | |
| 2006/0099482 A1* | 5/2006 | Scott | H01M 4/8605 429/483 |
| 2008/0206636 A1 | 8/2008 | Sanada et al. | |
| 2009/0068531 A1 | 3/2009 | Sawa et al. | |
| 2009/0269645 A1 | 10/2009 | Onodera | |
| 2011/0123850 A1* | 5/2011 | Duong | H01M 2/1686 429/145 |
| 2013/0273442 A1 | 10/2013 | Ogumi et al. | |
| 2014/0124238 A1* | 5/2014 | Englund | C08K 3/26 174/120 SR |
| 2014/0205909 A1 | 7/2014 | Yonehara et al. | |
| 2014/0242470 A1* | 8/2014 | Ogata | H01M 4/88 429/246 |
| 2015/0188175 A1* | 7/2015 | Pearman | H01M 8/1004 429/480 |

FOREIGN PATENT DOCUMENTS

| | | |
|---|---|---|
| JP | 2002-201298 | 7/2002 |
| JP | 2007-157584 | 6/2007 |
| JP | 2007-188788 | 7/2007 |
| JP | 2008-088420 | 4/2008 |
| JP | 2009-016090 | 1/2009 |
| JP | 2009-026665 | 2/2009 |
| JP | 2010-283928 | 12/2010 |
| JP | 2011-108499 | 6/2011 |
| JP | 2011-190384 | 9/2011 |
| JP | 2012-099266 | 5/2012 |
| JP | 2012-102060 | 5/2012 |
| JP | 2012-224732 | 11/2012 |
| JP | 2013-120727 | 6/2013 |
| JP | 2013-218877 | 10/2013 |
| JP | 2004-006240 | 1/2014 |
| JP | 2004-127774 | 4/2014 |
| WO | 2010/109670 | 9/2010 |
| WO | 2013/027767 | 2/2013 |

OTHER PUBLICATIONS

Tomita, et al., "Shinki Yuki-Muki Hybrid Hydrogel Denkaishitsu no Sakusei to Denki Kagaku Device eno Oyo" (Preparation of New Organic-Inorganic Hybrid Hydrogel Electrolytes for Electrochemical Devices), Abstracts of Annual Meeting of the Electrochemical Society of Japan, Mar. 29, 2011, 78th ed., p. 52—A concise explanation of relevance can be found in the Written Opinion for PCT/JP2014/052116. A translation will be provided upon request.
Written Opinion of the International Searching Authority issued in International Application No. PCT/JP2014/052116, dated Mar. 11, 2014, 10 pages.
International Search Report issued in International Application No. PCT/JP2014/052116, dated Mar. 11, 2014, 8 pages.

* cited by examiner

ANION CONDUCTING MATERIAL AND CELL

TECHNICAL FIELD

The present invention relates to an anion conducting material and a cell. More specifically, the present invention relates to an anion conducting material that can be suitably used, for example, as a separator, an electrolyte, or an electrode protecting agent of a cell; and a cell including a cell component such as a separator, an electrolyte, or an electrode protecting agent each containing the anion conducting material.

BACKGROUND ART

Anion conducting materials selectively permeable to ions in a solution have been widely used in various industrial fields. Today, storage cells are widely used in various fields such as electronic devices including mobile devices and notebook computers, automobiles, and aircraft, and these storage cells include components such as a separator and an electrolyte disposed between a cathode and an anode. For example, an anion conducting material can be used as a material of the separator and the electrolyte.

Examples of conventional anion conducting materials include an alkaline electrolyte membrane formed from a layered double hydroxide represented by a specific formula (for example, see Patent Literature 1), and a quaternizing agent for forming an anion-exchange resin membrane, which is formed from a compound represented by a specific formula (for example, see Patent Literature 2).

CITATION LIST

Patent Literature

Patent Literature 1: WO 2010/109670
Patent Literature 2: JP 2007-188788 A

SUMMARY OF INVENTION

Technical Problem

Unfortunately, the electrolyte membrane and the resin membrane disclosed in Patent Literatures 1 and 2, respectively, are sometimes insufficient in durability depending on use conditions. Thus, there has been a strong demand for an anion conducting material having wider applicability. Conventional anion conducting materials have room for further improvement to achieve sufficient durability under alkaline conditions and high anion conductivity for suitable applicability in various uses. Specifically, since no anion conducting materials exist that are durable in practical applications, current fuel cells usually contain a cation conducting material such as Nafion which is an acidic electrolyte (membrane). This practically entails the use of expensive platinum as a catalyst. If a new anion conducting material described above can be developed, the anion conducting material can be used as a separator, an electrolyte (membrane), or an electrode protecting agent of a fuel cell, and it will be possible to produce an excellent fuel cell containing an alkaline electrolytic solution in which an inexpensive catalyst can be used and to widely spread such a fuel cell. The anion conducting material can also be used in electrochemical devices such as alkaline (ion) (storage) cells, alkaline earth (ion) (storage) cells, manganese-zinc (storage) cells, nickel-hydrogen (storage) cells, nickel-zinc (storage) cells, nickel-cadmium (storage) cells, zinc ion (storage) cells, silver-zinc (storage) cells, zinc-halogen (storage) cells, lead storage cells, air (storage) cells, and capacitors. The anion conducting material can also be used as an ion exchange material, an agent for absorbing trace elements, or the like.

The present invention is made in view of the above circumstances and aims to provide an anion conducting material having excellent anion conductivity and durability, which can be suitably used, for example, as a separator, an electrolyte, or an electrode protecting agent of an alkaline (storage) cell, a nickel-hydrogen (storage) cell, a nickel-zinc (storage) cell, a zinc ion (storage) cell, a silver-zinc (storage) cell, a zinc-halogen (storage) cell, an air (storage) cell, a fuel cell, or a capacitor. The present invention also aims to provide a cell including a separator, an electrolyte, or an electrode each containing the anion conducting material.

Solution to Problem

The present inventors formed a membrane containing a zinc-containing compound and a polymer such as polyvinylidene fluoride on a current collector, and passed a current using a saturated solution of zinc oxide in an aqueous solution of potassium hydroxide as an electrolytic solution. As a result, they found that zinc was able to dissolve and deposit (i.e., electrodeposit) on the current collector under the membrane. The present inventor also formed a membrane containing a layered double hydroxide such as hydrotalcite and a polymer such as polytetrafluoroethylene on a zinc compound-containing electrode, and passed a current. As a result, they found that a change in the form of a zinc electrode active material was suppressed. In other words, the membrane was found to be conductive and permeable to only specific anions.

Specifically, the present inventors obtained the following findings: during reduction bypassing a current, the above membrane is conductive and permeable to zinc-containing ions such as $[Zn(OH)_4]^{2-}$ in an electrolytic solution, which causes deposition of zinc particles on the current collector; and further, during oxidation by passing a current, the above membrane is conductive and permeable to hydroxide ions in the electrolytic solution, and the hydroxide ions react with the zinc particles, which causes dissolution of the zinc particles and deposition of some of the zinc oxide particles on the current collector. The present inventors also obtained the following findings: as a result of controlling the composition and preparation method of the membrane as described above, the material functions as a separator, an electrolyte (membrane), or an electrode protecting agent, which is conductive and permeable to only specific anions; and a change in the form of the zinc electrode active material is suppressed because the material is conductive and permeable to hydroxide ions but is not conductive or permeable to zinc-containing ions such as $[Zn(OH)_4]^{2-}$.

From these experimental results, the present inventors arrived at the idea that the above membrane would be capable of functioning as an anion conducting material, and stared new studies on an anion conducting material that could be used in various applications other than the application as an active material layer. As a result, the present inventors found that such an anion conducting material was capable of exhibiting the same effect even in the presence of polymers and inorganic compounds other than those described above. Specifically, an anion conducting material containing a polymer and a compound containing at least one element selected from Groups 1 to 17 of the periodic table was found to achieve high anion conductivity and durability, thus providing an excellent anion conductor. Further, the present inventors found a specific structure of an anion conducting material particularly excellent in anion conductivity and durability.

The present inventors used such an anion conducting material, for example, as a material of a separator of a cell that uses an electrolytic solution containing an aqueous alkaline solution, and found that the anion conducting material was sufficient in durability under alkaline electrolytic solution conditions and was capable of suitably conducting anions. Such an anion conducting material was also found to be suitably applicable to a material other than a component of a cell. In other words, being durable against alkaline electrolytic solution conditions, the anion conducting material of the present invention can be particularly preferably used as a separator, an electrolyte, or an electrode protecting agent of cells using an alkaline electrolytic aqueous solution such as an alkaline (storage) cell, a nickel-hydrogen (storage) cell, a nickel-zinc (storage) cell, a nickel-cadmium cell, a zinc ion (storage) cell, a silver-zinc (storage) cell, a zinc-halogen (storage) cell, an air (storage) cell, a fuel cell, or the like. The anion conducting material can also be suitably used in other electrochemical devices such as other cells, capacitors, and hybrid capacitors. In addition to these electrochemical devices, the anion conducting material can also be suitably used as an ion exchange material, an agent for absorbing trace elements, or the like. The present inventors successfully arrived at a solution to the above problems, and thus accomplished the present invention.

Patent Literature 1 discloses an alkaline electrolyte membrane formed from a layered double hydroxide as described above, but is silent about an anion conducting material containing a polymer. The anion conductivity and the durability of the membrane of Patent Literature 1 are not comparable to those of the present invention. Patent Literature 2 discloses a quaternizing agent for forming an anion-exchange resin membrane as described above. Yet, a quaternary ammonium salt easily undergoes decomposition in alkali (particularly at a high temperature of 50° C. or higher). Thus, there was a room for improvement to make the quaternizing agent durable under practical use conditions.

Specifically, the present invention provides an anion conducting material containing a polymer and a compound containing at least one element selected from Groups 1 to 17 of the periodic table.

According to the present invention, the compound contained in the anion conducting material is at least one compound selected from the group consisting of an oxide, a hydroxide, a layered double hydroxide, a phosphoric acid compound, and a sulfuric acid compound. The term "hydroxide" as used herein refers to hydroxides other than layered double hydroxides.

Further, according to the present invention, the anion-conductive polymer preferably contains at least one selected from the group consisting of an aromatic group, a halogen atom, a carboxyl group, a carboxylate group, a hydroxyl group, an amino group, and an ether group, or the anion-conductive polymer is preferably a hydrocarbon.

The present invention provides a cell including a cell component containing the anion conducting material.

In the cell of the present invention, the cell component is at least one selected from the group consisting of a separator, a cathode, an anode, and an electrolyte.

The present invention is described in detail below.

A combination of two or more of preferred embodiments of the present invention described below is also a preferred embodiment of the present invention.

Owing to the structure described above, the anion conducting material of the present invention is a material that is permeable to anions involved in cell reaction. The material may be selectively permeable to certain anions. For example, anions such as hydroxide ions may easily pass through the material, but diffusion of anions such as metal-containing ions having a large ionic radius may be sufficiently prevented. The term "anion conductivity" as used herein means that the material is sufficiently permeable to anions having a small ionic radius such as hydroxide ions or ability of the anions to pass through material to such anions. Anions having a large ionic radius such as metal-containing ions are more difficult to pass through the material, and these anions do not have to pass at all.

The compound containing at least one element selected from Groups 1 to 17 of the periodic table preferably contains at least one element selected from the group consisting of alkali metals, alkaline earth metals, Sc, Y, lanthanoids, Ti, Zr, Hf, V, Nb, Ta, Cr, Mo, W, Mn, Fe, Ru, Co, Ni, Pd, Cu, Ag, Au, Zn, Cd, B, Al, Ga, In, Tl, C, Si, Ge, Sn, Pb, N, P, Sb, Bi, S, Se, Te, F, Cl, and Br. Among these, a preferred compound is one containing at least one element selected from Groups 1 to 15 of the periodic table. A preferred compound is one containing at least one element selected from the group consisting of Li, Na, K, Cs, Mg, Ca, Sr, Ba, Sc, Y, lanthanoids, Ti, Zr, Nb, Cr, Mn, Fe, Ru, Co, Ni, Pd, Cu, Ag, Au, Zn, Cd, B, Al, Ga, In, Tl, C, Si, Ge, Sn, Pb, N, P, Sb, and Bi. A more preferred compound is one containing at least one element selected from the group consisting of Li, Na, K, Mg, Ca, Ba, Sc, Y, lanthanoids, Ti, Zr, Nb, Cr, Mn, Fe, Ru, Co, Ni, Pd, Cu, Zn, Cd, B, Al, Ga, In, Tl, Si, Ge, Sn, Pb, P, and Bi. Hereinafter the compound containing at least one element selected from Groups 1 to 17 of the periodic table is also simply referred to as the "inorganic compound".

One or more inorganic compounds may be used.

Examples of the compound containing at least one element selected from Groups 1 to 17 of the periodic table include oxides; complex oxides; layered double hydroxides; hydroxides; clay compounds; solid solutions; alloys; zeolite; halides; carboxylate compounds; carbon compounds; hydrocarbon compounds; nitric acid compounds; sulfuric acid compounds; sulfonic acid compounds; phosphoric acid compounds such as hydroxyapatite; phosphorous acid compounds; hypophosphorous acid compounds, boric acid compounds; silicic acid compounds; aluminic acid compounds; sulfides; onium compounds; and salts. Preferred examples include oxides; complex oxides; layered double hydroxides such as hydrotalcite; hydroxides; clay compounds; solid solutions; zeolite; fluorides; phosphoric acid compounds; boric acid compounds; silicic acid compounds; aluminic acid compounds; and salts. More preferred examples include at least one compound selected from the group consisting of an oxide, a hydroxide, a layered double hydroxide, a phosphoric acid compound, and a sulfuric acid compound, as described above. Still more preferred examples include layered double hydroxides and oxides. Most preferably, a layered double hydroxide is an essential component.

Preferred examples of the oxides include at least one compound selected from the group consisting of lithium oxide, sodium oxide, potassium oxide, cesium oxide, magnesium oxide, calcium oxide, barium oxide, scandium oxide, yttrium oxide, lanthanoid oxide, titanium oxide, zirconium oxide, niobium oxide, ruthenium oxide, cobalt oxide, nickel oxide, palladium oxide, copper oxide, cadmium oxide, boron oxide, gallium oxide, indium oxide, thallium oxide, silicon oxide, germanium oxide, tin oxide, lead oxide, phosphorus oxide, and bismuth oxide. More preferred examples include magnesium oxide, calcium oxide, barium oxide, lanthanoid oxide, zirconium oxide, niobium oxide, copper oxide, gallium oxide, indium oxide, germanium oxide, tin oxide, lead oxide, phosphorus oxide, and bismuth oxide. Still more preferred examples include cerium oxide and zirconium oxide. A particularly preferred example is cerium oxide. The cerium oxide may be doped with a metal oxide such as samarium oxide, gadolinium oxide, or bismuth oxide, or may be in the form of a solid solution with a metal oxide such as zirconium oxide. The cerium oxide may have oxygen vacancies.

The hydrotalcite is a compound represented by the following formula:

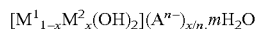

[$M^1_{1-x}M^2_x(OH)_2$]($A^{n-}$)$_{x/n}$.$mH_2O$ (wherein $M^1$ is Mg, Fe, Zn, Ca, Li, Ni, Co, Cu, or the like; $M^2$ is Al, Fe, Mn, or the like; A is $CO_3^{2-}$ or the like; m is a positive number of 0 or greater; n is 2 or 3; x is in the range of about 0.20≤x≤about 0.40). The hydrotalcite may be dehydrated by firing at 150° C. to 900° C.; or interlayer anions in the hydrotalcite may be decomposed or exchanged with hydroxide ions or the like. Alternatively, natural minerals such as $Mg_6Al_2(OH)_{16}CO_3.mH_2O$ may be used as the inorganic compounds. In the case where a solid electrolyte that uses hydrotalcite does not contain a polymer or an oligomer, the anion conducting material preferably contains multivalent ions other than hydrotalcite and/or an inorganic compound, and more preferably contains hydrotalcite in which x is 0.33. A compound having a functional group such as a hydroxyl group, an amino group, a carboxyl group, or a silanol group may be coordinated to the hydrotalcite.

Preferred examples of the hydroxide include at least one compound selected from the group consisting of lithium hydroxide, sodium hydroxide, potassium hydroxide, cesium hydroxide, magnesium hydroxide, calcium hydroxide, barium hydroxide, scandium hydroxide, yttrium hydroxide, lanthanoid hydroxide, titanium hydroxide, zirconium hydroxide, niobium hydroxide, ruthenium hydroxide, cobalt hydroxide, nickel hydroxide, palladium hydroxide, copper hydroxide, cadmium hydroxide, boric acid, gallium hydroxide, indium hydroxide, thallium hydroxide, silicic acid, germanium hydroxide, tin hydroxide, lead hydroxide, phosphoric acid, and bismuth hydroxide. More preferred examples include magnesium hydroxide, calcium hydroxide, barium hydroxide, lanthanoid hydroxide, zirconium hydroxide, niobium hydroxide, copper hydroxide, gallium hydroxide, indium hydroxide, germanium hydroxide, tin hydroxide, lead hydroxide, phosphorus hydroxide, and bismuth hydroxide. Still more preferred examples include cerium hydroxide and zirconium hydroxide. Preferred examples of the sulfuric acid compound include ettringite.

Preferred examples of the phosphoric acid compound include hydroxyapatite.

The hydroxyapatite is a compound represented by $Ca_{10}(PO_4)_6(OH)_2$. Examples of such a compound usable as the inorganic compound include compounds in which the amount of calcium is reduced by controlling preparation conditions and hydroxyapatite compounds into which an element other than calcium has been introduced. The hydroxyapatite may also contain fluorine.

The anion conducting material of the present invention is preferably solidified (formed into a membrane) by fibrillation of a polymer (described later) or a thickening or binding effect of the polymer. Alternatively, the anion conducting material may be in the form of gel. When used in a cell, the anion conducting material functions as a (gel) electrolyte, a separator, an electrode protecting agent, or the like. The inorganic compound may be, for example, in a dissolved state, a dispersed state (such as a colloidal state), an insolubilized state, or a fibrillated state when introduced into an active material, a solvent (such as water or an organic solvent), an electrolytic solution material, an electrolytic solution, a (gel) electrolyte, a binder, a thickening agent, or the like. A portion of the surface of the inorganic compound may be positively or negatively charged. In this case, the charged state of particles can be estimated by measurement of the zeta potential, for example. As described later, the inorganic compound(s) may interact with a functional group of the polymer via covalent bond or a non-covalent bond such as a coordination bond, an ionic bond, a hydrogen bond, a π bond, a van der Waals bond, or agostic interaction. In the case of using a layered compound such as hydrotalcite, a polymer may be formed between the layers, and as a result, maybe crosslinked. In addition, when the inorganic compound is introduced into an electrolytic solution material, an electrolytic solution, a gel electrolyte, or the like, the inorganic compound may be used in a state where a portion of its surface is not positively or negatively charged (a condition that corresponds to the isoelectric point). In such a case, a bond such as a van der Waals bond or a coordination bond is a preferred driving force of interaction.

Preferably, the inorganic compound contains particles that satisfy the following average particle size and/or the following specific surface area. More preferably, the inorganic compound consists of particles that satisfy the following average particle size and/or the following specific surface area.

The average particle size of the inorganic compound is preferably 1000 μm or less, more preferably 200 μm or less, still more preferably 100 μm or less, particularly preferably 75 μm or less, and most preferably 20 μm or less. At the same time, the average particle size is preferably 5 nm or more, more preferably 10 nm or more.

The average particle size can be measured with a particle size distribution meter.

The particles of the inorganic compound may be in the form of, for example, fine powder, powder, particles, grains, scale-like particles, polyhedral particles, rod-like particles, and partially round particles. The particles having the average particle size in the above range can be produced by the following methods, for example: a method in which the particles are pulverized with a ball mill or the like, the resulting coarse particles are dispersed in a dispersing agent to obtain particles having a desired particles size, and these particles are solidified by drying; a method in which the coarse particles are passed through a sieve or the like to sort the particles by particle size; and a method in which preparation conditions are optimized during particle production to obtain (nano) particles having a desired particle size.

The specific surface area of the inorganic compound is preferably 0.01 m²/g or more, more preferably 0.1 m²/g or more, still more preferably 0.5 m²/g or more. At the same time, the specific surface area is preferably 500 m²/g or less.

The specific surface area can be measured by nitrogen adsorption BET method using a specific surface area meter or the like. The particles having a specific surface area in the above range can be produced, for example, by making the particles into nano-sized particles or by roughening the particle surface by selecting preparation conditions during particle production.

In the case where the inorganic compound mainly consists of elongated particles, for example, rectangular parallelepiped or cylindrical (fibrillated) particles, the aspect ratio (vertical/lateral) is preferably 1.1 or more. The aspect ratio (vertical/lateral) is more preferably 2 or more, still more preferably 3 or more. At the same time, the aspect ratio (vertical/lateral) is preferably 100000 or less, more preferably 50000 or less.

The aspect ratio (vertical/lateral) can be determined, for example, from the particle shape observed by SEM. For example, in the case where each particle of the inorganic compound has a rectangular parallelepiped shape, the aspect ratio can be determined by dividing the vertical length by the lateral length, where the vertical means the longest side and the lateral means the second longest side. In the case of other shapes, the aspect ratio can be determined as follows: a particle is placed such that a certain one point faces downward and the particle is projected to two dimensions from the direction that provides the maximum aspect ratio; then, the distance between the certain one point and the farthest point therefrom is measured; and the aspect ratio is determined by dividing the vertical length by the lateral length, where the vertical means the longest side and the lateral means the longest side among the straight lines crossing the center of the vertical axis.

The particles having an aspect ratio (vertical/lateral) within the above range can be obtained by, for example, selecting the particles having such an aspect ratio, or optimizing preparation conditions during particle production to selectively produce such particles.

The proportion of the inorganic compound relative to 100% by mass of the anion conducting material is preferably 0.1% by mass or more, more preferably 0.5% by mass or more, still more preferably 1% by mass or more, further more preferably 3% by mass or more, particularly preferably 20% by mass or more. At the same time, the proportion is preferably 99.9% by mass or less, more preferably 90% by mass or less, still more preferably 75% by mass or less, further more preferably less than 70% by mass, particularly preferably less than 60% by mass, most preferably less than 55% by mass.

If the proportion by mass of the inorganic compound is in the above range, it is possible to achieve the effects of the present invention and an effect that prevents cracks in the anion conducting material. It is particularly preferred to use the layered double hydroxide in a proportion by mass within the above range.

Examples of the polymer include hydrocarbon moiety-containing polymers such as polyethylene and polypropylene, and aromatic group-containing polymers such as polystyrene; ether group-containing polymers such as alkylene glycol; hydroxyl group-containing polymers such as polyvinyl alcohol and poly(α-hydroxymethylacrylate); amide bond-containing polymers such as polyamide, nylon, polyacrylamide, polyvinylpyrrolidone, and N-substituted polyacrylamide; imide-bond containing polymers such as polymaleimide; carboxyl group-containing polymers such as poly(meth)acrylic acid, polymaleic acid, polyitaconic acid, and polymethyleneglutaric acid; carboxylate-containing polymers such as poly(meth)acrylate, polymaleic acid salts, polyitaconic acid salts, and polymethyleneglutaric acid salts; halogen-containing polymers such as polyvinyl chloride, polyvinylidene fluoride, and polytetrafluoroethylene; polymers bonded by ring opening of epoxy groups such as epoxy resin; sulfonate moiety-containing polymers; quaternary ammonium salt- and quaternary phosphonium salt-containing polymers; ion-exchange polymers used for cation-anion exchange membranes; natural rubber; synthetic rubber such as styrene butadiene rubber (SBR); saccharides such as cellulose, cellulose acetate, hydroxyalkyl cellulose, carboxymethyl cellulose, hydroxyethyl cellulose, chitin, chitosan, and alginic acid (salt); amino group-containing polymers such as polyethyleneimine; carbamate group moiety-containing polymers; carbamide group moiety-containing polymers; epoxy group moiety-containing polymers; heterocycle and/or ionized heterocycle moiety-containing polymers; polymer alloys; heteroatom-containing polymers; and low molecular weight surfactants. Among these, the polymer preferably contains at least one selected from the group consisting of an aromatic group, a halogen atom, a carboxyl group, a carboxylate group, a hydroxyl group, an amino group, and an ether group, or the polymer is preferably a hydrocarbon. In other words, the anion-conductive polymer of the present invention preferably contains at least one selected from the group consisting of an aromatic group, a halogen atom, a carboxyl group, a carboxylate group, a hydroxyl group, an amino group, and an ether group, or the anion-conductive polymer is preferably a hydrocarbon. Among these polymers, if a crosslinked polymer is used, it is better that the crosslinked polymer be not water absorbent because a water-absorbent, crosslinked polymer may cause cracks in the anion conducting material.

One or more polymers may be used.

The polymer can be obtained from monomers (i.e., structural units) by a polymerization method such as radical (co)polymerization, anionic (co)polymerization, cationic (co)polymerization, graft (co)polymerization, living (co)polymerization, dispersion (co)polymerization, emulsion (co)polymerization, suspension (co)polymerization, ring-opening (co)polymerization, cyclic (co)polymerization, (co)polymerization by light, ultraviolet light, or electron beam irradiation, metathesis (co)polymerization, and electrolysis (co)polymerization. In the case where the polymer has a functional group, the functional group may be present in the main chain and/or the side chain, or may be present as a binding site with a crosslinking agent. One or more polymers may be used. The polymer may be crosslinked by an organic crosslinking compound other than the inorganic compound via a bond such as ester bond, amide bond, ionic bond, van der Waals bond, agostic interaction, hydrogen bond, acetal bond, ketal bond, ether bond, peroxide bond, carbon-carbon bond, carbon-nitrogen bond, carbon-oxygen bond, carbon-sulfur bond, carbamate bond, thiocarbamate bond, carbamide bond, thiocarbamide bond, oxazoline moiety-containing bond, or triazine bond. Yet, it is most preferred that the polymer be not crosslinked.

The polymer preferably has a weight average molecular weight of 200 to 7000000, so that the properties of the anion conducting material such as ionic conductivity and flexibility can be controlled. The weight average molecular weight is more preferably 400 to 6500000, still more preferably 500 to 5000000.

The weight average molecular weight can be measured by gel permeation chromatography (GPC) or with a UV detector.

The proportion of the polymer by mass relative to 100% by mass of the anion conducting material is preferably 0.1% by mass or more. The proportion is more preferably 1% by mass or more, still more preferably 25% by mass or more, more preferably more than 30% by mass, particularly preferably more than 40% by mass, most preferably more than 45% by mass. At the same time, the proportion is preferably 99.9% by mass or less, more preferably 99.5% by mass or less, still more preferably 99% by mass or less, more preferably 97% by mass or less, particularly preferably 80% by mass or less, so that the effect that prevents cracks in the anion conducting material is achieved and the effects of the present invention can be made significant.

The mass ratio of the polymer to the inorganic compound is preferably 5000000/1 to 1/100000, more preferably 2000000/1 to 1/50000, still more preferably 1000000/1 to 1/10000, more preferably 1000000/1 to 1/100, still more preferably 100/3 to 75/100, particularly preferably 100/50 to 75/100. If the above mass ratio is satisfied in the case where the inorganic compound contained in the anion conducting material of the present invention is hydrotalcite, the effect that provides the anion conducting material with excellent anion conductivity and the effect that prevents cracks in the anion conducting material can be made significant.

The anion conducting material of the present invention may further contain an additional component as long as it contains a polymer and an inorganic compound. One or more polymers, one or more inorganic compounds, and one or more additional component may be used.

The additional component is not particularly limited, and examples thereof include zinc-containing compounds, alumina, silica, polymers, conductive carbon, conductive ceramics, and polymers. The additional component is preferably a compound different from the inorganic compound and the preferred polymer of the anion conducting material described above. The additional component can facilitate ion conductivity, and can also form pores (described later) by being removed by means such as solvent, heat, firing, or electricity.

A preferred average particle size of the additional component is the same as the preferred average particle size of the inorganic compound described above.

The average particle size of the additional component can be measured by the same method for the average particle size of the inorganic compound.

The particle shape of the additional component and a preparation method of the particles having a desired average particle size are the same as those described above for the inorganic compound.

A preferred specific surface area of the particles of the additional component, a method for measuring the specific surface area, and a preparation method of the particles of the additional component having a desired specific surface area are the same as those described above for the inorganic compound.

A preferred aspect ratio (vertical/lateral) of the additional component, a method for measuring the aspect ratio, and a preparation method of the particles of the additional component having a desired aspect ratio are the same as those describe above for the inorganic compound.

The proportion of the additional component relative to 100% by mass of the anion conducting material is preferably 0.001% by mass or more, more preferably 0.01% by mass or more, still more preferably 0.05% by mass or more. At the same time, the proportion is preferably 90% by mass or less, more preferably 80% by mass or less, still more preferably 70% by mass or less, particularly preferably 45% by mass or less. The additional component may be completely absent.

The anion conducting material of the present invention can be prepared, for example, by the following method.

The polymer, the inorganic compound, and the additional component (if necessary) are mixed together. In the anion conducting material of the present invention, it is preferred that the polymer and the inorganic compound be mixed together. Mixing can be carried out using a device such as a mixer, blender, kneader, bead mill, ready mill, or ball mill. At the time of mixing, water, an organic solvent such as methanol, ethanol, propanol, isopropanol, butanol, hexanol, tetrahydrofuran, or N-methylpyrrolidone, or a solvent mixture of water and an organic solvent may be added. Before or after mixing, particles maybe passed through a sieve or the like so that the particles have a desired particles size. Mixing may be carried out by a wet process in which liquid components such as water and an organic solvent are added to solid components, or by a dry process in which only solid components are used without adding liquid components. In the case of the wet process, the mixture maybe dried so that liquid components such as water or an organic solvent are removed. The wet process and the dry process may be combined. Mixing may be carried out under increased or reduced pressure, or under heat.

A slurry or paste mixture is obtained by the above preparation method. The produced slurry or paste mixture may be subjected to coating, pressure-bonding, bonding, electric welding, rolling, stretching, or melting, if necessary. The anion conducting material can be formed into a membrane (sheet) by coating, pressure-bonding, bonding, electric welding, rolling, stretching, or melting. Properties of the active material (layer) and the anion conducting material, such as strength and anion conductivity level, can be controlled by fibrillation of the polymer during coating, pressure-bonding, bonding, electric welding, rolling, stretching, or melting. In addition, the anion conducting material can be applied to a desired structure by coating, pressure-bonding, bonding, electric welding, rolling, stretching, or melting in such a manner that the thickness of the resulting membrane is as uniform as possible.

The slurry or paste mixture is preferably dried at 0 to 400° C. during and/or after coating, pressure-bonding, bonding, electric welding, rolling, stretching, or melting. At this point, the polymer contained in the slurry or paste mixture may be melted. A more preferred drying temperature is in the range of 15 to 380° C. Drying may be carried out under reduced pressure or in vacuo. Drying is preferably carried out for 5 minutes to 48 hours. The steps of coating and drying may be repeated. In addition, before and after drying, the slurry or paste mixture may be pressed with a roll press or the like at a pressure in the range of normal pressure to 20 t. The pressure is more preferably in the range of normal pressure to 15 t. The temperature upon pressing may be in the range of 10 to 400° C. The step of pressing may be carried out once or several times. At the time of pressing, adhesion between the inorganic compounds and/or adhesion between the inorganic compound and the polymer can be improved, the polymer can be fibrillated, and the properties of the anion conducting material such as thickness, strength, and flexibility can be controlled.

The structure is preferably formed from various materials having a smooth surface, mesh materials, and punched materials, yet the materials are not particularly limited. Examples thereof include insulators, conductive materials, electrode, and other various materials, such as nonwoven fabrics, fine porous membranes, separators (described later), glass filters, carbon paper, membrane filters, water-repellent materials, glass, metal foil, metal mesh (expandable metal), and punched metal.

The anion conducting material maybe integrated with the structure by coating, pressure-bonding, bonding, electric welding, rolling, stretching, or melting. In this case, owing to the polymer in the anion conducting material, the resulting material will have improved strength and flexibility, and sliding of the anion conducting material and the solid electrolyte out of the structure will be greatly reduced.

The anion conducting material maybe integrated with the structure by coating, pressure-bonding, bonding, electric welding, rolling, stretching, or melting. When the anion conducting material is used as a component of a cell such as an air cell or a fuel cell, the anion conducting material and the structure integrated with the anion conducting material may include a catalyst layer and a gas diffusion layer.

The membranous anion conducting material can be modified into various shapes such as a folded shape and a wound shape.

One or more anion conducting materials may be used. These anion conducting materials may be in the mixed, melted, stacked, or composite form. The form is not particularly limited.

The anion conducting material of the present invention is usually membranous and used to selectively conduct ions.

The thickness of the membrane can be suitably selected according to the use. Yet, for example, the thickness is preferably 0.01 µm or more, more preferably 0.1 µm or more, still more preferably 1 µm or more. At the same time, for example, the thickness is preferably 50 mm or less, more preferably 20 mm or less, still more preferably 10 mm or less, most preferably 1 mm or less.

Pores may be present or absent on the surface or in the inside of the membrane as long as the effects of the present invention are achieved. For example, in some cases, pores may be preferably present in view of improving the anion conductivity. In other cases, pores may be preferably absent in view of use the membrane in a fuel cell or an air cell. For use as a separator, an electrolyte, or an electrode protecting agent of a (storage) cell that uses a zinc electrode, pores may be present as long as a short circuit due to dendrite growth of a zinc electrode active material does not occur.

When the anion conducting material of the present invention is used as a separator, an electrolyte, or an electrode protecting agent of a cell, the cell may be in the form of a primary cell; a secondary cell capable of charging and discharging (storage cell); a cell that uses mechanical charge (a cell that involves mechanical exchange of a zinc anode); and a cell that uses a third electrode (for example, an electrode that removes oxygen or hydrogen generated during charge and discharge) which is different from the cathode or the anode. For example, a secondary cell (storage cell) is preferred.

As described above, it is another aspect of the present invention to provide a cell including any of a separator, a cathode, an anode, and an electrolytic solution (electrolyte) each containing the anion conducting material of the present invention.

In addition, one important technical significant of the cell of the present invention is that an excellent anion conducting material can be used in an electrolytic solution, particularly in an alkaline electrolytic solution. When the ionic conducting material is used as a component of an air cell or a fuel cell, the ionic conducting material is preferably not highly permeable to gases such as oxygen and hydrogen. More preferably, the amount of gas that passes through the material is about 0 to 100 µL/(min·cm$^2$).

The separator is a component that separates the cathode from the anode and maintains the electrolytic solution to provide ionic conductivity between the cathode and the anode. In addition, the separator suppresses deterioration of an active material or formation of dendrites in the case of a cell that uses an electrode such as a zinc electrode in which an active material undergoes a change in the form.

The separator can fulfill its functions when it includes the anion conducting material of the present invention. Examples of the separator include nonwoven fabrics; glass filters; membrane filters; paper; hydrocarbon moiety-containing polymers such as polyethylene; aromatic group-containing polymers such as polystyrene; ether group-containing polymers such as alkylene glycol; hydroxyl group-containing polymers such as polyvinyl alcohol; amide-group containing polymers such as polyacrylamide; imide group-containing polymers such as polymaleimide; carboxyl group-containing polymers such as poly(meth)acrylic acid; carboxylate group-containing polymers such as poly(meth)acrylate; halogen-containing polymers such as polyvinylidene fluoride and polytetrafluoroethylene; sulfonate group moiety-containing polymers; quaternary ammonium salt group- and quaternary phosphonium salt group-containing polymers; ion-exchange polymers; natural rubber; synthetic rubber such as styrene butadiene rubber (SBR); saccharides such as hydroxyalkyl cellulose (for example, hydroxyethyl cellulose) and carboxymethyl cellulose; amino group-containing polymers such as polyethyleneimine; ester group-containing polymers; carbonate group-containing polymers; carbamate group-containing polymers; agar; gel compounds; organic-inorganic hybrid (composite) compounds; and inorganic materials such as ceramics.

The anion conducting material maybe integrated with the separator by coating, pressure-bonding, bonding, electric welding, rolling, stretching, or melting. In this case, owing to the polymer in the anion conducting material, the resulting material will have improved strength and flexibility, and sliding of the anion conducting material and the solid electrolyte out of the structure will be greatly reduced.

Functions of the separator, such as wetting the positive and anodes, improving the flow of the electrolytic solution, and preventing shortage of the electrolytic solution, will also improve.

In the case where the separator contains the polymer, the polymer containing a specific moiety or functional group may be a polymer having a monomer unit that does not contain the specific moiety or functional group, as long as it is a polymer partially having a monomer unit containing the specific moiety or functional group. The polymer may be a copolymer.

The separator may contain a compound containing at least one element selected from the group consisting of elements of the Groups 1 to 17 of the periodic table. In the case where the separator contains the polymer having a functional group, the functional group may be present in the main chain or the side chain. In addition, the main chain may be crosslinked via a bond such as ester bond, amide bond, ionic bond, van der Waals bond, agostic interaction, hydrogen bond, acetal bond, ketal bond, ether bond, peroxide bond, carbon-carbon bond, carbon-nitrogen bond, carbamate bond, thiocarbamate bond, carbamide bond, thiocarbamide bond, oxazoline moiety-containing bond, and triazine bond.

One or more separators may be used. Any number of separators can be used as long as the cell performance does not deteriorate due to an increase in the resistance. The separator may include fine pores, micropores, a repellent material (layer), a catalyst (layer), or a gas diffusion material (layer). In the case of using a water-containing electrolytic solution, the separator is preferably hydrophilically treated with surfactant treatment, sulfonation treatment, fluorine gas treatment, plasma treatment, acrylic acid graft treatment, or corona treatment. A solid (gel) electrolyte may also be used with the water-containing electrolytic solution.

In another embodiment, the present invention provides an anion conducting material containing a polymer and hydrotalcite.

Preferred embodiments of the polymer, the hydrotalcite, and the anion conducting material are the same as those described above for the polymer, the inorganic compound, and the anion conducting material of the present invention. One or more kinds of polymers, and one or more kinds of hydrotalcite can be used.

The present invention also provides a membrane in which the anion conducting material of the present invention is integrated with a structure.

Integration can be suitably carried out by a method such as coating, pressure-bonding, bonding, electric welding, rolling, stretching, or melting.

The structure is preferably membranous (sheet-like), and the examples of the separator of the present invention mentioned above can be suitably used.

Use of the membrane of the present invention in an electrode of a cell results in particularly excellent charge/discharge cycle characteristics, as described in Example 11.

The active material of the cathode is not particularly limited and may be any active material commonly used as a cathode active material of a primary cell or a secondary cell. Examples thereof include oxygen (in the case where oxygen serves as a cathode active material, the cathode is an air electrode made of a compound capable of reducing oxygen and oxidizing water, and examples thereof include perovskite compounds, cobalt-containing compounds, iron-containing compounds, copper-containing compounds, manganese-containing compounds, vanadium-containing compounds, nickel-containing compounds, iridium-containing compounds, platinum-containing compounds; palladium-containing compounds; gold-containing compounds; silver compounds; and carbon-containing compounds); nickel-containing compounds such as nickel oxyhydroxide, nickel hydroxide, and cobalt-containing nickel hydroxide; manganese-containing compounds such as manganese dioxide; silver oxide; lithium-containing compounds such as cobalt lithium oxide; iron-containing compounds; and carbon-containing compounds.

In one preferred embodiment of the present invention, the cathode active material is a nickel-containing compound or a manganese-containing compound among the above examples.

In another preferred embodiment of the present invention, the cathode active material is oxygen as in the case of a cell such as an air cell or a fuel cell. In other words, in another preferred embodiment of the present invention, the cathode of the cell of the present invention is capable of reducing oxygen.

The cathode may contain the anion conducting material.

Examples of the active material of the anode include materials commonly used as anode active materials such as carbon, lithium, sodium, magnesium, zinc, cadmium, lead, tin, silicon, hydrogen storage alloys, and other materials containing noble metals such as platinum. The anode may contain the anion conducting material. The anion conducting material of the present invention can also be used as a separator, a solid (gel) electrolyte, or an electrode protecting agent of a cell such as a lithium-ion cell, a nickel-hydrogen cell, a nickel-zinc cell, a nickel-cadmium cell, a manganese-zinc cell, a zinc ion cell, a lead cell, an air cell, or a fuel cell. In addition, the anion conducting material can also be used as an ion exchange material, an agent for absorbing trace elements, or the like. The active material of the anode of a fuel cell is not particularly limited, and may be any active material commonly used as an anode active material of a fuel cell. Examples thereof include hydrogen, methanol, ethanol, propanol, butanol, ethylene glycol, propylene glycol, and ammonia.

In the case where an ionic conducting material is used as a material of a cell and an electrolytic solution is used, the electrolytic solution is not particularly limited as long as it is a commonly used electrolytic solution of a cell. Examples thereof include a water-containing electrolytic solution and an organic solvent-type electrolytic solution. A water-containing electrolytic solution is preferred. The water-containing electrolytic solution refers to an electrolytic solution (aqueous electrolytic solution) containing only water as the electrolytic solution material, and an electrolytic solution containing a liquid mixture of water and an organic solvent as the electrolytic solution material. The anion conducting material can exhibit anion conductivity under various conditions such as humidifying conditions, non-humidifying conditions, heating conditions, and conditions in which, for example, the electrolytic solution or a solvent is absent.

Examples of the aqueous electrolytic solution include alkaline electrolytic solutions such as an aqueous solution of potassium hydroxide, an aqueous solution of sodium hydroxide, and an aqueous solution of lithium hydroxide; an aqueous solution of zinc sulfate; an aqueous solution of zinc nitrate; aqueous solution of zinc phosphate; and an aqueous solution of zinc acetate. One or more aqueous electrolytic solutions can be used.

The water-containing electrolytic solution may contain an organic solvent used in an organic solvent-based electrolytic solution. Examples of the organic solvent include ethylene carbonate, propylene carbonate, dimethyl carbonate, diethyl carbonate, γ-butyrolactone, dimethoxymethane, diethoxymethane, dimethoxyethane, tetrahydrofuran, methyltetrahydrofuran, diethoxyethane, dimethylsulfoxide, sulfolane, acetonitrile, benzonitrile, ionic liquids, fluorine-containing carbonates, fluorine-containing ethers, polyethylene glycols, and fluorine-containing polyethylene glycols. One or more organic solvent-based electrolytic solutions can be used. The electrolyte of the organic solvent-based electrolytic solution is not particularly limited. Examples thereof include $LiPF_6$, $LiBF_4$, $LiB(CN)_4$, lithium bis(fluorosulfonyl)imide (LiFSI), and lithium bis(trifluoromethylsulfonyl)imide (LiTFSI).

In the case of a water-containing electrolytic solution containing an organic solvent-based electrolytic solution, the amount of the aqueous electrolytic solution relative to the total mass (100% by mass) of the aqueous electrolytic solution and organic solvent-based electrolytic solution is preferably 10 to 99.9% by mass, more preferably 20 to 99.9% by mass.

A solid (gel) electrolyte, the anion conducting material, and the anion conducting material containing the electrolytic solution can be used as solid (gel) electrolytes.

A solid (gel) electrolyte can also be used as the electrolyte. The solid (gel) electrolyte is not particularly limited as long as it can be used as an electrolyte of a cell. Examples thereof include solid (gel) electrolytes containing the same compounds of the anion conducting material and the separator, and solid (gel) electrolytes crosslinked by a crosslinking agent.

As described above, it is another aspect of the present invention to provide a cell including any of a separator, a cathode, an anode, and an electrolytic solution (electrolyte) each containing the anion conducting material of the present invention. More preferably, the cell is one that uses an alkaline electrolytic solution (electrolyte), such as an alkaline (storage) cell, a nickel-hydrogen (storage) cell, a nickel-cadmium (storage) cell, a nickel-zinc (storage) cell, a zinc ion (storage) cell, a lead cell, a silver-zinc (storage) cell, an air (storage) cell, or a fuel cell.

The anion conducting material of the present invention is particularly preferably used as a separator, an electrolyte, or an electrode protecting agent of the alkaline (storage) cell. The anion conducting material of the present invention can also be used in applications other than the separator of the cell and other cell components. For example, the anion conducting material can be used as ion-exchange resin and for purposes such as removal of oxygen removal, removal of pollutant anions, water treatment, purification, and decolorization.

Advantageous Effects of Invention

Owing to the above-described structure, the anion conducting material of the present invention has excellent anion conductivity and durability, and can be suitably used, for example, as a separator, an electrolyte, an electrode protecting agent of a cell such as an alkaline (storage) cell, a fuel cell, or an air cell.

DESCRIPTION OF EMBODIMENTS

Figure 1:
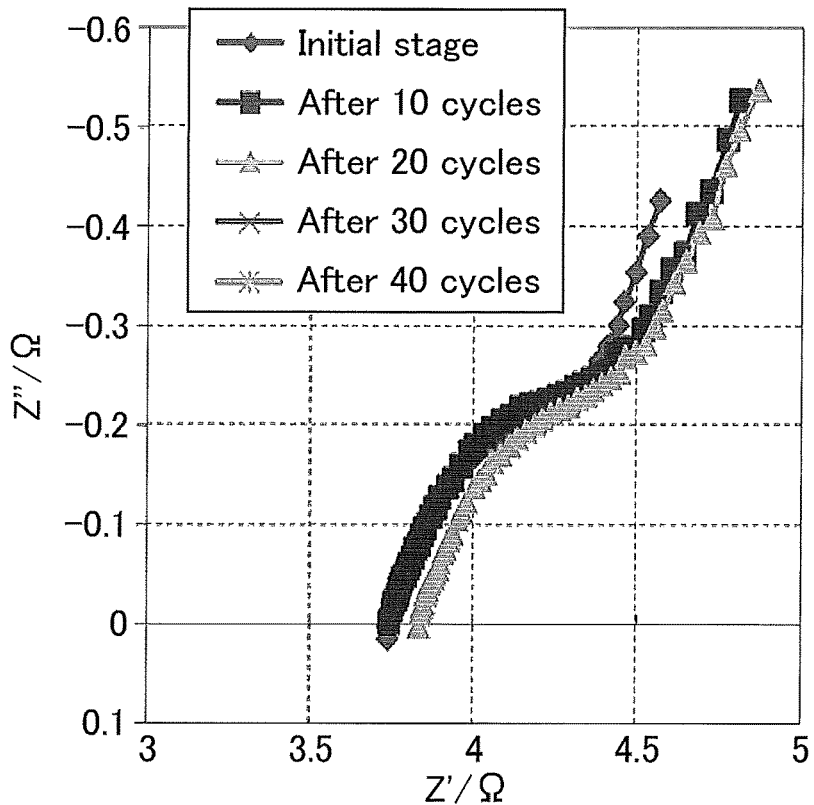
FIG. 1 is a graph showing the results of an impedance test performed on an anion conducting material of Example 1.

The present invention is described in further detail below with reference to examples, but the present invention is not limited to these examples.

Example 1

Zinc oxide (27.6 g), cerium(IV) oxide (2.4 g), ethanol (99.5%) (92.7 g), and water (92.7 g) were added and mixed in a ball mill. Then, the mixture was dried using an evaporator under reduced pressure at 100° C. for two hours, and further dried using a stationary-type vacuum dryer at 110° C. overnight. The dried solid was pulverized at 18000 rpm for 60 seconds using a pulverizer (X-TREME MX1200XTM available from WARING). The resulting solid (1.1 g), a solution of 12% polyvinylidene fluoride in N-methylpyrrolidone (2.0 g), and N-methylpyrrolidone (0.90 g) were placed in a glass vial and stirred overnight using a stirrer with a stir bar. The resulting slurry was applied to copper foil using an automatic coating device, and dried at 80° C. for 12 hours. The copper foil coated with the zinc mixture was pressed at 3 t, and then punched out using a punching device (diameter: 15.95 mm).

The copper foil was peeled from the material to obtain a membranous compound. The membranous compound was immersed in a saturated solution of zinc oxide in an aqueous solution of 4 mol/L potassium hydroxide, and then placed on copper foil again. A zinc mixture electrode was thus obtained and used as a working electrode (zinc mixture weight: 0.98 mg) having an apparent area of 0.48 $cm^2$.

The saturated solution of zinc oxide in an aqueous solution of 4 mol/L potassium hydroxide was used as the electrolytic solution; a zinc plate was used as the counter electrode, and a zinc wire was used as the reference electrode. Then, a charge/discharge test was performed for 10 cycles using the three-electrode cell at a current of 0.64 mA/$cm^2$ (charge and discharge times: one hour for each). In this manner, zinc oxide was removed, pores were formed, and an anion conducting material was produced.

The anion conducting material was peeled from the copper foil, and placed on new copper foil again. Then, a charge/discharge test (charge and discharge times: one hour for each) was performed for 40 cycles under the same conditions. An impedance test was performed every 10 cycles. The results showed that the resistance did not change at all (FIG. 1). FIG. 1 is a graph showing the results of the impedance test performed on the anion conducting material of Example 1. Observation with a scanning electron microscope (SEM) confirmed that zinc dissolved and deposited (electrodeposited) and that there were no changes in the anion conducting material.

Comparative Example 1

Zinc oxide (27.6 g), ethanol (99.5%) (92.7 g), and water (92.7 g) were added and mixed in a ball mill. Then, the mixture was dried using an evaporator under reduced pressure at 100° C. for two hours, and further dried using a stationary-type vacuum dryer at 110° C. overnight. The dried solid was pulverized at 18000 rpm for 60 seconds using a pulverizer (X-TREME MX1200XTM available from WARING). The resulting solid (1.1 g), a solution of 12% polyvinylidene fluoride in N-methylpyrrolidone (2.0 g), and N-methylpyrrolidone (0.90 g) were placed in a glass vial and stirred overnight using a stirrer with a stir bar. The resulting slurry was applied to copper foil using an automatic coating device, and dried at 80° C. for 12 hours. The copper foil coated with the zinc mixture was pressed at 3 t, and then punched out using a punching device (diameter: 15.95 mm).

The copper foil was peeled from the material to obtain a membranous compound. The membranous compound was immersed in a saturated solution of zinc oxide in an aqueous solution of 4 mol/L potassium hydroxide, and then placed on copper foil again. A zinc mixture electrode was thus obtained and used as a working electrode (zinc mixture weight: 1.43 mg) having an apparent area of 0.48 $cm^2$.

The saturated solution of zinc oxide in an aqueous solution of 4 mol/L potassium hydroxide was used as the electrolytic solution; a zinc plate was used as the counter electrode, and a zinc wire was used as the reference electrode. Then, a charge/discharge test was performed for 10 cycles using the three-electrode cell at a current of 0.93 mA/$cm^2$ (charge and discharge times: one hour for each). In this manner, zinc oxide was removed, pores were formed, and an anion conducting material was produced.

Figure 2:
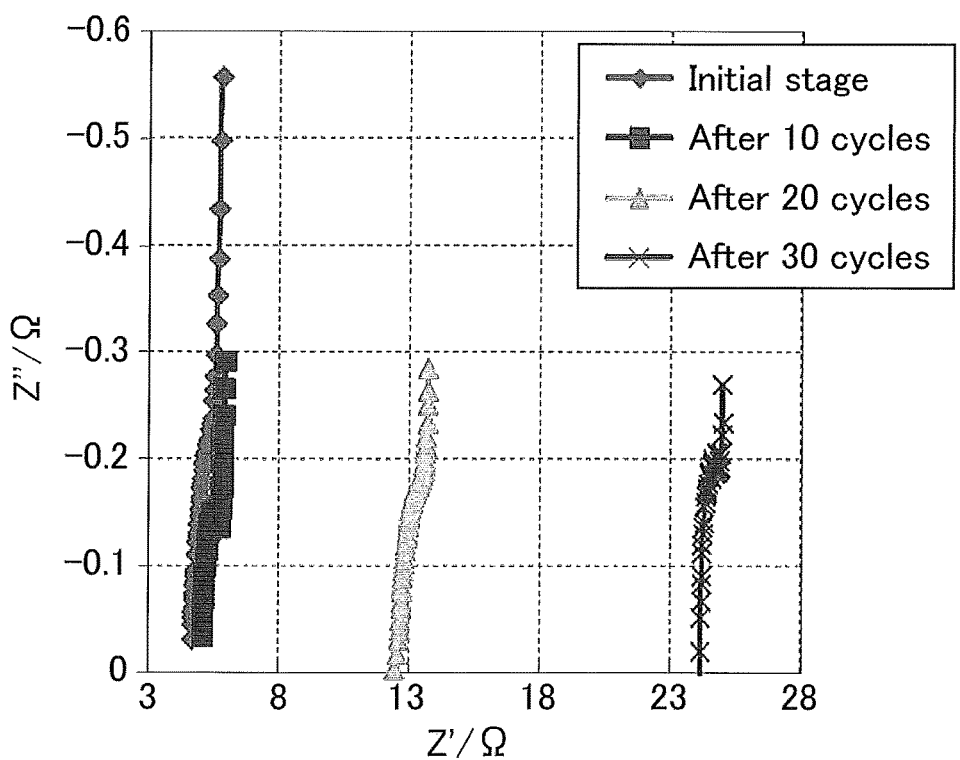
FIG. 2 is a graph showing the results of an impedance test performed on an anion conducting material of Comparative Example 1.

The anion conducting material was peeled from the copper foil, and placed on new copper foil again. Then, a charge/discharge test (charge and discharge times: one hour for each) was performed for 40 cycles under the same conditions. An impedance test was performed every 10 cycles. The results showed an increase in the resistance (FIG. 2). FIG. 2 is a graph showing the results of the impedance test performed on the anion conducting material of Comparative Example 1. Observation with a scanning electron microscope (SEM) confirmed that zinc dissolved and deposited (electrodeposited) and that zinc species that deposited on the copper foil underwent passivation. Passivation is considered to be caused by shortage of hydroxide ions, i.e., lack of anion conductivity in the anion conducting material of Comparative Example 1.

Example 2

An aqueous solution (11 mg) of 60% polytetrafluoroethylene and water were added to zinc oxide (149 mg) and mixed well with an agate mortar. The resulting zinc oxide paste was applied to a copper mesh (50 mesh) having a diameter of 14 mm and pressure-bonded at a pressure of 6 kN. Thus, an active material layer (A) was obtained. Separately, polytetrafluoroethylene (3.2 g) and water were added to hydrotalcite (2.5 g) and mixed well with an agate mortar. The resulting hydrotalcite paste was rolled to a thickness of 1 mm to obtain an anion conducting material. Then, the anion conducting material was punched out to a diameter of 14 mm to obtain an electrode protecting agent (B). Subsequently, the electrode protecting agent (B) was pressure-bonded to the active material layer (A) at a pressure of 6 kN. Thus, a zinc mixture electrode (C) containing an anion conducting material was obtained. This electrode (C) was used as the working electrode (zinc mixture weight: 79 mg) having an apparent area of 0.79 $cm^2$.

Figure 3:
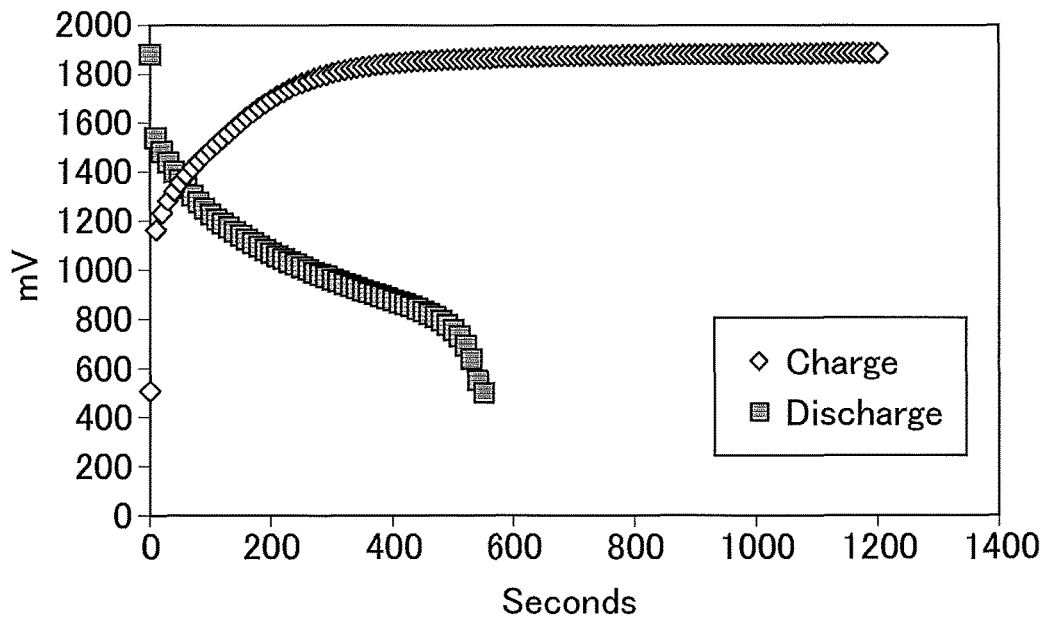
FIG. 3 is a graph showing the results of a charge/discharge test in Example 2, indicating the charge curve of the 10th cycle and the discharge curve of the 10th cycle.

An air electrode with air holes (QSI-Nano manganese gas diffusion electrode available from TOMOE ENGINEERING CO., LTD.) was used as the counter electrode; a saturated solution of zinc oxide in an aqueous solution of 8 mol/L potassium hydroxide was used as the electrolytic solution. Then, a charge/discharge test was performed on the zinc-air storage cell (two-electrode cell) at a current of 5 mA (charge and discharge times: 20 minutes for each, cut off at 2.0 V and 0.5 V). FIG. 3 is a graph showing the results of the charge/discharge test in Example 2, indicating the charge curve of the 10th cycle and the discharge curve of the 10th cycle. The cell can be evaluated as being capable of stably performing charging and discharging. Observation with a field emission scanning electron microscope (FE-SEM) confirmed that at least 50 charge/discharge cycles can be stably performed and that components of the zinc electrode active material did not penetrate into the anion conducting layer.

Example 3

Palladium chloride (0.1 g) and a trace amount of concentrated hydrochloric acid were dissolved in water (250 mL), and two pieces of stainless steel wire mesh (9 cm in height and 9 cm in width) were immersed therein for one hour for plating. Thus, an electrode was produced. Polytetrafluoroethylene (3.2 g), an aqueous solution of 2% sodium acrylate (0.3 g), and water were added to hydrotalcite (2.5 g), and mixed well with an agate mortar. The resulting hydrotalcite paste was rolled to a thickness of 2 mm to obtain an anion conducting material, and the anion conducting material was cut out to 10 cm in height and 10 cm in width. Then, the electrode was applied to both sides of the anion conducting material to obtain a cell. The anion conducting material was wetted with an aqueous solution of 1 mol/L potassium hydroxide. Subsequently, hydrogen was supplied to one electrode and oxygen was supplied to the other electrode to confirm generation of electricity by the cell as a fuel cell with an ammeter and voltmeter.

Example 4

An experiment was performed as in Example 3 except that a mixture of hydrotalcite, cerium oxide, and polytetrafluoroethylene in a mass ratio of 4:1:6 was used as the anion conducting material. Operation of the fuel cell was confirmed.

Example 5

An experiment was performed as in Example 3 except that a mixture of hydrotalcite, niobium oxide, and polytetrafluoroethylene in a mass ratio of 4:1:6 was used as the anion conducting material. Operation of the fuel cell was confirmed.

Example 6

An experiment was performed as in Example 3 except that a mixture of cerium oxide and polytetrafluoroethylene in a mass ratio of 4:6 was used as the anion conducting material. Operation of the fuel cell was confirmed.

Example 7

An experiment was performed as in Example 3 except that a mixture of ettringite and polytetrafluoroethylene in a mass ratio of 4:6 was used as the anion conducting material. Operation of the fuel cell was confirmed.

Example 8

An experiment was performed as in Example 3 except that a mixture of hydrotalcite, ethylenimine, and polytetrafluoroethylene in a mass ratio of 4:0.5:6 was used as the anion conducting material. Operation of the fuel cell was confirmed.

Example 9

An experiment was performed as in Example 3 except that a mixture of hydrotalcite, sodium polyacrylate, and polytetrafluoroethylene in a mass ratio of 4:0.2:6 was used as the anion conducting material. Operation of the fuel cell was confirmed.

Example 10

Figure 4:
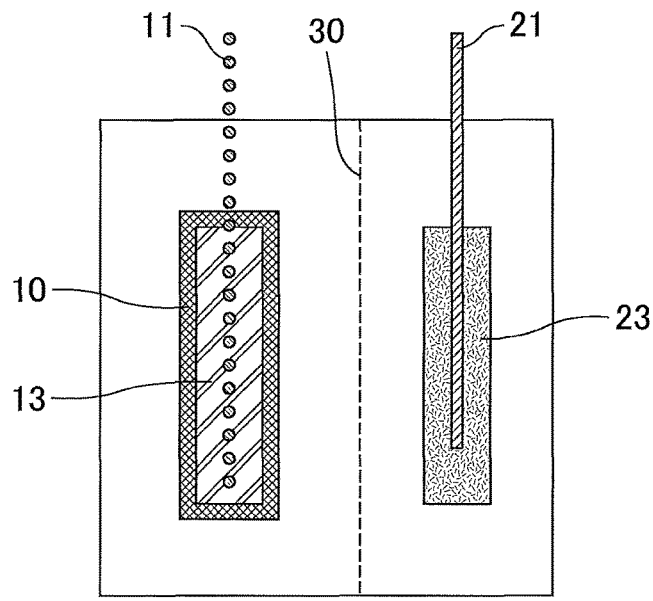
FIG. 4 is a cross-sectional schematic view of a cell of Example 10.

For implementation of the present invention, a cell having a structure shown in FIG. 4 was formed and a charge/discharge cycle test was performed as described later. In Example 10, a zinc oxide active material layer (i.e., an anode active material) was pressure-bonded to a copper mesh current collector. The resulting product was covered with an anion conducting material to produce a zinc anode containing the anion conducting material. At this point, $Zn(OH)_4^{2-}$ ions can be effectively trapped in the anion conducting material of the anode to suppress diffusion of the ions. A mixture of hydrotalcite and polytetrafluoroethylene in a mass ratio of 4:6 was used as an anion conducting material 10. Polytetrafluoroethylene is preferred because (1) it is an insulating material; (2) it allows powder of the anion conducting material to bind together; and (3) it has excellent physical strength.

While disposing the thus-produced anion conducting material 10 on the zinc anode, a 2% aqueous solution of sodium polyacrylate was applied between the zinc anode and the anion conducting membrane to enhance adhesion.

The zinc anode containing the anion conducting material produced above was used as the anode; a nickel electrode was used as the cathode; and the same electrode used as the cathode was charged to 50% and used as the reference electrode. A nonwoven fabric was disposed between the cathode and the anode, and a saturated solution of zinc oxide in an aqueous solution of 8 mol/L potassium hydroxide was used as the electrolytic solution. In this manner, a three-electrode cell was produced, and a charge/discharge cycle test was performed with an electrode area of 1.95 cm$^2$ and at a current of 25 mA/cm$^2$ (charge and discharge times: one hour for each). At this point, the coulombic efficiency did not decrease, and at least 200 charge/discharge cycles were stably performed.

Example 11

The anion conducting material 10 was produced as in Example 10. Further, the anion conducting material was rolled with a nonwoven fabric to enhance its physical strength, and the resulting product was disposed on the zinc anode. The zinc electrode containing the anion conducting material produced above was used as the anode; a nickel electrode was used as the cathode; and the same electrode used as the cathode was charged to 50% and used as the reference electrode. A nonwoven fabric was disposed between the cathode and the anode, and an aqueous solution of 8 mol/L potassium hydroxide saturated with zinc oxide was used as the electrolytic solution. In this manner, a three-electrode cell was produced, and a charge/discharge cycle test was performed. The electrode area was 1.95 cm$^2$ and the current was 25 mA/cm$^2$ (charge and discharge times: one hour for each). At this point, the coulombic efficiency did not decrease, and at least 200 charge/discharge cycles were stably performed.

The anion conducting membrane was rolled with a nonwoven fabric either on one side or both sides of the anion conducting membrane. A similar cycle life was observed in both cases. A similar cycle life was also observed in the case where an aqueous solution of 2% sodium polyacrylate was applied between the anion conducting membrane and the nonwoven fabric to enhance adhesion between the anion conducting membrane and the nonwoven fabric.

Example 12 and Comparative Example 2

A zinc anode was produced as in Example 10.

Figure 5:
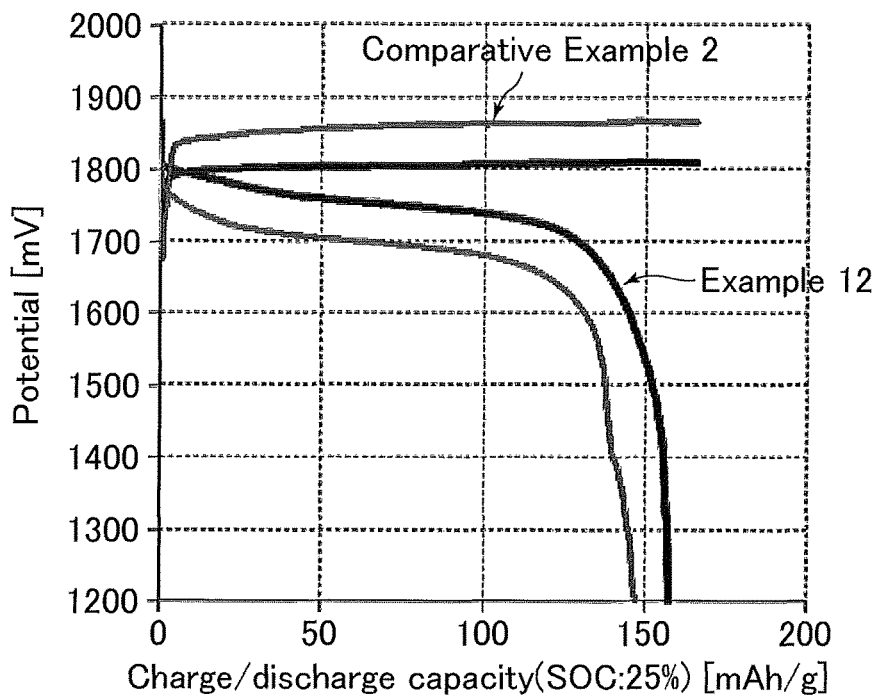
FIG. 5 is a graph showing the results of a charge/discharge test obtained as Example 12 and Comparative Example 2.

The zinc electrode containing the anion conducting material produced above was used as the anode; a nickel electrode was used as the cathode; and the same electrode used as the cathode was charged to 50% and used as the reference electrode. A nonwoven fabric was disposed between the cathode and the anode, and an aqueous solution of 8 mol/L potassium hydroxide saturated with zinc oxide was used as the electrolytic solution. In this manner, a three-electrode cell was produced, and a charge/discharge cycle test was performed. The electrode area was 1.95 cm$^2$ and the current was 25 mA/cm$^2$ (charge and discharge times: one hour for each). FIG. 5 shows potential for charge/discharge capacity as "Example 12".

Meanwhile, a three-electrode cell was produced into which two hydrophilic microporous membranes were inserted instead of the anion conducting membrane, and a comparative experiment was performed. As a result, an increase in ohmic loss was observed due to an increase in the number of resistance components. The potential for charge/discharge capacity of the cell produced as in Example 12 except that two hydrophilic microporous membranes were inserted instead the anion conducting membrane is shown as "Comparative Example 2" in FIG. 5.

Example 13 and Comparative Example 3

A zinc anode was produced as in Example 10.

Figure 6:
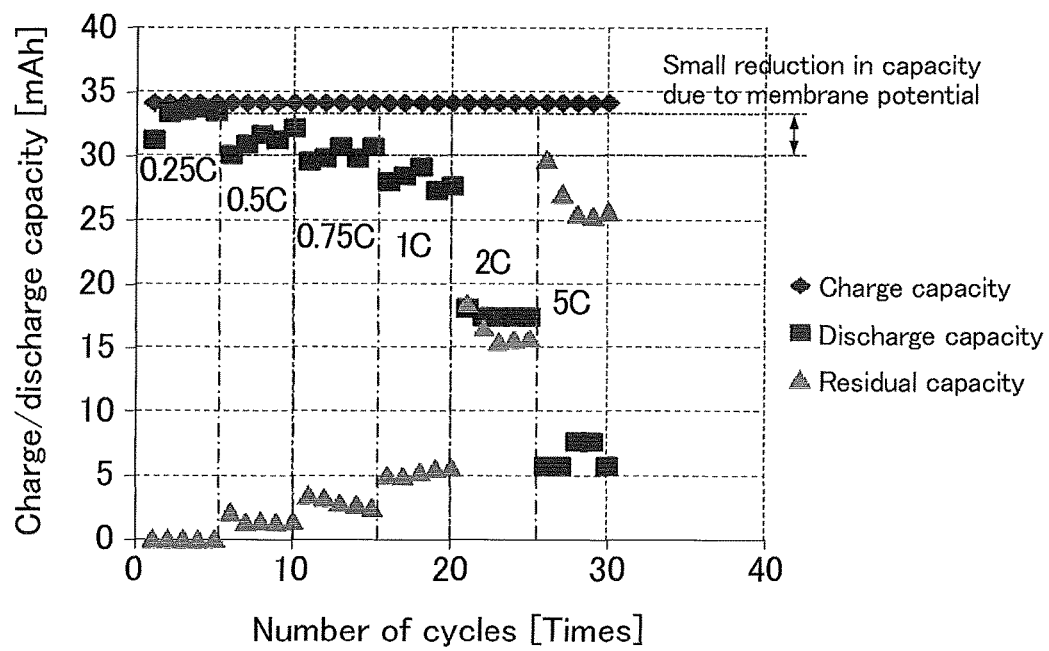
FIG. 6 is a graph showing discharge rate characteristics in Example 13.
Figure 7:
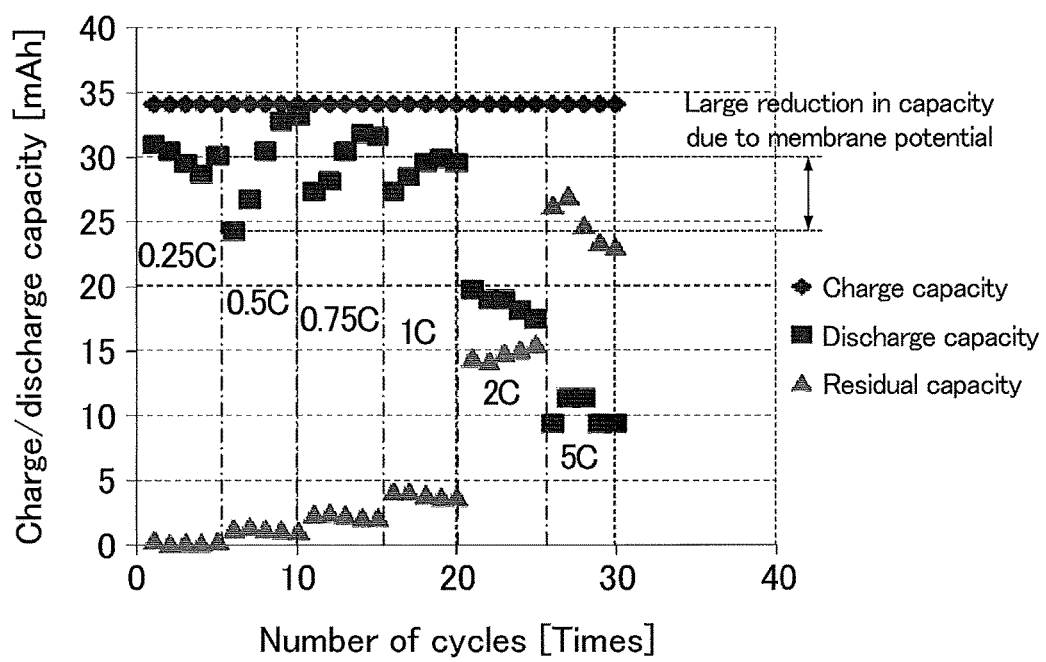
FIG. 7 is a graph showing discharge rate characteristics in Comparative Example 3.

The zinc electrode containing the anion conducting material produced above was used as the anode; a nickel electrode was used as the cathode; and the same electrode used as the cathode was charged to 50% and used as the reference electrode. A nonwoven fabric was disposed between the cathode and the anode, and an aqueous solution of 8 mol/L potassium hydroxide saturated with zinc oxide was used as the electrolytic solution. In this manner, a three-electrode cell was produced, and a charge/discharge cycle test was performed. The electrode area was 1.95 cm$^2$. Meanwhile, a three-electrode cell was produced into which two hydrophilic microporous membranes were inserted instead of the anion conducting membrane. To perform a comparative experiment on these structures for discharge rate characteristics, 5 charge/discharge cycles were performed for each of the following discharge rates: 0.25 C, 0.5 C, 0.75 C, 1 C, 2 C, and 5 C, while the charge rate was fixed at 25 mA/cm$^2$ (0.25 C). FIG. 6 is a graph showing discharge rate characteristics of the three-electrode cell in which the anion conducting membrane was used (Example 13). FIG. 7 is a graph showing discharge rate characteristics of the three-electrode cell in which two hydrophilic microporous membranes were used (Comparative Example 3).

As a result, there was almost no difference in the discharge rate characteristic between when the anion conducting membrane was used and when the hydrophilic microporous membranes were used; however, a decrease in the discharge capacity was observed upon the shift in the discharge rate due the membrane potential. Effects of the membrane potential were compared. As a result, the effect of the membrane potential was observed to be smaller when the anion conducting membrane was used (FIG. 6) than when the hydrophilic microporous membranes were used (FIG. 7).

The electrodes of Examples 10 to 13 have the above-described structures. In the cells including the electrodes of Examples 10 to 13, anions such as hydroxide ions involved in cell reaction can easily pass through the anion conducting material covering the active material and/or the active material layer. The anion conducting material sufficiently contributes to excellent cell performance, sufficiently prevents diffusion of metal ions, and sufficiently suppresses short circuits caused by dendrites even after repeated charge/discharge cycles.

The results of the examples revealed the following findings.

The anion conducting material containing a polymer and a compound containing at least one element selected from Groups 1 to 17 of the periodic table demonstrated excellent anion conductivity and durability, and proved that it can be suitably used, for example, as a component such as a separator, an electrolyte, or an electrode protecting agent of a cell such as an alkaline cell.

In Example 1, the polymer was a specific fluorine-based polymer, and the inorganic compound was a compound containing a specific element. Yet, in any case, the anion conducting material of the present invention has excellent anion conductivity and durability and can be suitably used, for example, as a separator of an alkaline cell, as long as the anion conducting material contains a polymer and an inorganic compound.

In particular, as shown in Example 1, zinc dissolved and deposited (electrodeposited) and pores were formed in the anion conducting material. This advantageously improved the anion conductivity. For use in a fuel cell or an air cell, the anion conducting material without pores is considered to be preferred for minimizing crossover. For example, the anion conducting material without pores can be produced by not adding zinc oxide in advance. In the above examples, pores were formed by repeatedly performing a charge/discharge test. Yet, pores may be formed by methods other than the repeated charge/discharge test, as long as pores can be formed by dissolving or removing soluble particles such as zinc oxide. For example, in the case of the anion conducting material containing particles soluble in a basic solvent, pores may be formed by dissolving or removing the particles by washing the anion conducting material with a basic solvent.

In Example 2, in the use of the anion conducting material containing a polymer and an inorganic compound as a protective agent for protecting the active material layer, the polymer was polytetrafluoroethylene, and the inorganic compound was hydrotalcite. Yet, the following effects can be achieved in any case when the anion conducting material (membrane) is formed on the electrode such as a zinc compound-containing electrode, as long as the membrane composition is controlled in such a manner that the anion conducting material at least contains a polymer and a layered double hydroxide as an inorganic compound: a change in the form of an active material such as a zinc electrode active material is sufficiently suppressed even after the passage of a current; and the anion conducting material is conductive and permeable to hydroxide ions but is only minimally conductive and permeable to zinc-containing ions such as $[Zn(OH)_4]^{2-}$ so that the anion conducting material is conductive and permeable to only specific anions. Such an anion conducting material can also be suitably used as a cell component such as a separator and an electrolyte in addition to an electrode protecting agent.

Further, in Example 3, in the use of the anion conducting material containing a polymer and an inorganic compound as an electrolyte of a cell, the polymer was polytetrafluoroethylene, and the inorganic compound was hydrotalcite. Yet, electricity can be generated in any case by the fuel cell that uses the anion conducting material as the electrolyte, as long as the anion conducting material contains a polymer and an inorganic compound. Such an anion conducting material can also be suitably used as a cell component such as a separator and an electrode protecting agent in addition to an electrolyte. The applicable cell is not limited to a fuel cell. The anion conducting material can be suitably used in various cells such as alkaline cells in addition to fuel cells.

Thus, the results of the above examples show that the present invention is applicable to the entire technical scope of the present invention and can be used in various forms disclosed herein, and that the present invention achieves advantageous effects.

REFERENCE SIGNS LIST

10: anion conducting material
11, 21: current collector
13, 23: active material layer
30: separator

The invention claimed is:

1. A cell component comprising an anion conducting material selectively permeable to ions in solution, the anion conducting material comprising:
   a polymer, and
   magnesium hydroxide,
   wherein the magnesium hydroxide is 3% by mass or more of the anion conducting material, and
   the cell component is at least one selected from the group consisting of a separator, a positive electrode, a negative electrode, and an electrolyte.

2. The cell component according to claim 1, wherein the polymer contains at least one selected from the group consisting of an aromatic group, a halogen atom, a carboxyl group, a carboxylate group, a hydroxyl group, an amino group, and an ether group, or the polymer is a hydrocarbon.

3. A cell comprising the cell component as defined in claim 1.

* * * * *